United States Patent
Roques

(10) Patent No.: US 7,971,796 B2
(45) Date of Patent: Jul. 5, 2011

(54) CONTROL DEVICE FOR CONSERVING ENERGY OF A WATER HEATER

(75) Inventor: Bernard Roques, Bilieu (FR)

(73) Assignee: Cotherm, Vinay (FR)

( * ) Notice: Subject to any disclaimer, the term of this patent is extended or adjusted under 35 U.S.C. 154(b) by 357 days.

(21) Appl. No.: 12/176,766

(22) Filed: Jul. 21, 2008

(65) Prior Publication Data

US 2009/0090788 A1  Apr. 9, 2009

(30) Foreign Application Priority Data

Jul. 20, 2007  (FR) ..................................... 07 05254

(51) Int. Cl.
*F23N 1/08* (2006.01)
*B60H 1/00* (2006.01)
*H05B 1/02* (2006.01)

(52) U.S. Cl. ........................ 236/20 R; 237/8 A; 219/506

(58) Field of Classification Search ................ 236/20 R, 236/46 R; 237/8 A, 8 D, 19; 219/492, 493, 219/506; 165/268, 267

See application file for complete search history.

(56) References Cited

U.S. PATENT DOCUMENTS

| 5,442,157 | A | | 8/1995 | Jackson | |
|---|---|---|---|---|---|
| 6,002,114 | A | * | 12/1999 | Lee | ................................ 219/501 |
| 6,293,471 | B1 | * | 9/2001 | Stettin et al. | ................ 236/20 R |
| 2005/0029248 | A1 | * | 2/2005 | Patterson et al. | ............. 219/492 |

FOREIGN PATENT DOCUMENTS

| EP | 1 281 940 | | 2/2003 |
|---|---|---|---|
| EP | 1281940 A1 | * | 2/2003 |
| GB | 2 265 454 | | 9/1993 |
| GB | 2 272 105 | | 5/1994 |
| WO | 2006/079123 | | 7/2006 |

OTHER PUBLICATIONS

International Search Report of FR0705254 dated Mar. 11, 2008.

* cited by examiner

*Primary Examiner* — Chen-Wen Jiang
(74) *Attorney, Agent, or Firm* — Young & Thompson

(57) ABSTRACT

The control device for conserving energy for heating water contained in a water heater (30) comprises an electronic detection device (21) for measuring the quantity of hot water remaining in the tank (2), the electronic detection device (21) consisting of a capillary tube (10) containing a heat transfer fluid and an amplification device (15) placed outside the tank (2) of the water heater (30) and connected to an electronic control card (26), the amplification device (15) being suitable for transmitting a variation in resistance to the electronic control card (26) under the effect of the expansion of the fluid contained in the capillary tube (10) and control means (50) connected to the electronic control card (26) for determining the hot water consumption profile of the users in order to control the period or periods of resumption of the heating of the water in the tank (2).

17 Claims, 2 Drawing Sheets

CONTROL DEVICE FOR CONSERVING ENERGY OF A WATER HEATER

The present invention relates to a control device for conserving energy on an electric, electro-solar, hydrosolar storage water heater by optimizing the periods and durations of the resumptions of heating of the water contained in said water heater.

The resumptions of heating the water contained in the water heater can be effected for example by means of a boiler, a heat pump, or electrical resistors.

European patent EP 1 281 940 teaches a level detection device for a fluid in an electric storage water heater. The detection device comprises a capillary tube comprising coils or swellings forming an amplification device housed inside the tank of the water heater.

This detection device only enables the users to know the volume of hot water consumed. The detection device described in prior patent EP 1 281 940 is not adapted to optimize the periods and durations of the resumptions of heating of the water contained in the water heater.

It is therefore the object of the control device according to the present invention to provide continuous information about the quantity of hot water remaining in the tank of the water heater and to conserve energy on an electric, electro-solar, hydrosolar storage water heater, by optimizing the periods and durations of resumptions of the heating of the water contained in said water heater in order to minimize the heat losses of the water heater through its insulation.

The control device for conserving energy for heating water contained in a storage tank and more particularly in a tank of a water heater comprising a cold water inlet and a hot water outlet according to the present invention comprises:

an electronic detection device for measuring the quantity of hot water remaining in the tank, said electronic detection device consisting of a capillary tube containing a heat transfer fluid and an amplification device connected to an electronic control card, said amplification device being suitable for transmitting a variation in resistance to the electronic control card under the effect of the expansion of the fluid contained in the capillary tube, and control means connected to the electronic control card for determining the hot water consumption profile of the users in order to control the period or periods of resumption of the heating of the water in the tank.

The control device according to the present invention comprises an electronic detection device provided with a capillary tube placed either inside or outside the tank of the water heater.

The control device according to the present invention comprises a capillary tube provided to have substantially the same height as the tank of the water heater.

The control device according to the present invention comprises an electronic detection device comprising an amplification device which consists of a membrane joined to an electronic sensor connected via a connection to the electronic control card.

The control device according to the present invention comprises a capillary tube connected hermetically to the membrane of the amplification device which is deformed under the effect of the expansion of the heat transfer fluid.

The control device according to the present invention comprises an amplification device connected via a connection to the electronic control card for controlling at least one resistor to restart the electro-solar or hydrosolar water heater.

The control device according to the present invention comprises control means consisting of a flowmeter placed at the cold water inlet of the water heater and a temperature probe placed at the hot water outlet, said flowmeter and said temperature probe being connected to the electronic control card.

The control device according to the present invention comprises an amplification device connected via a connection to the electronic control card for controlling the circulation of a heat transfer fluid issuing from a boiler in a coil located inside a hydrosolar water heater.

The control device according to the present invention comprises an amplification device connected via a connection to the electronic control card for controlling the circulation of a heat transfer fluid issuing from solar collectors in a coil located inside an electro-solar or hydrosolar water heater.

The control device according to the present invention comprises control means provided with a temperature probe placed at the cold water inlet of the water heater and connected to the electronic control card.

The control device according to the present invention comprises control means consisting of a flowmeter and a temperature probe placed respectively at the inlet of a coil located inside the tank of the water heater, said flowmeters and temperature probes being connected to the electronic control card.

The control device according to the present invention comprises control means which consist of temperature probes placed in the tank of the water heater, so as to be located close to a resistor and coils, said temperature probes being connected to the electronic control card by suitable connections.

The appended drawings, provided as examples, offer a closer understanding of the invention, its features and the advantages thereof:

Figure 1:
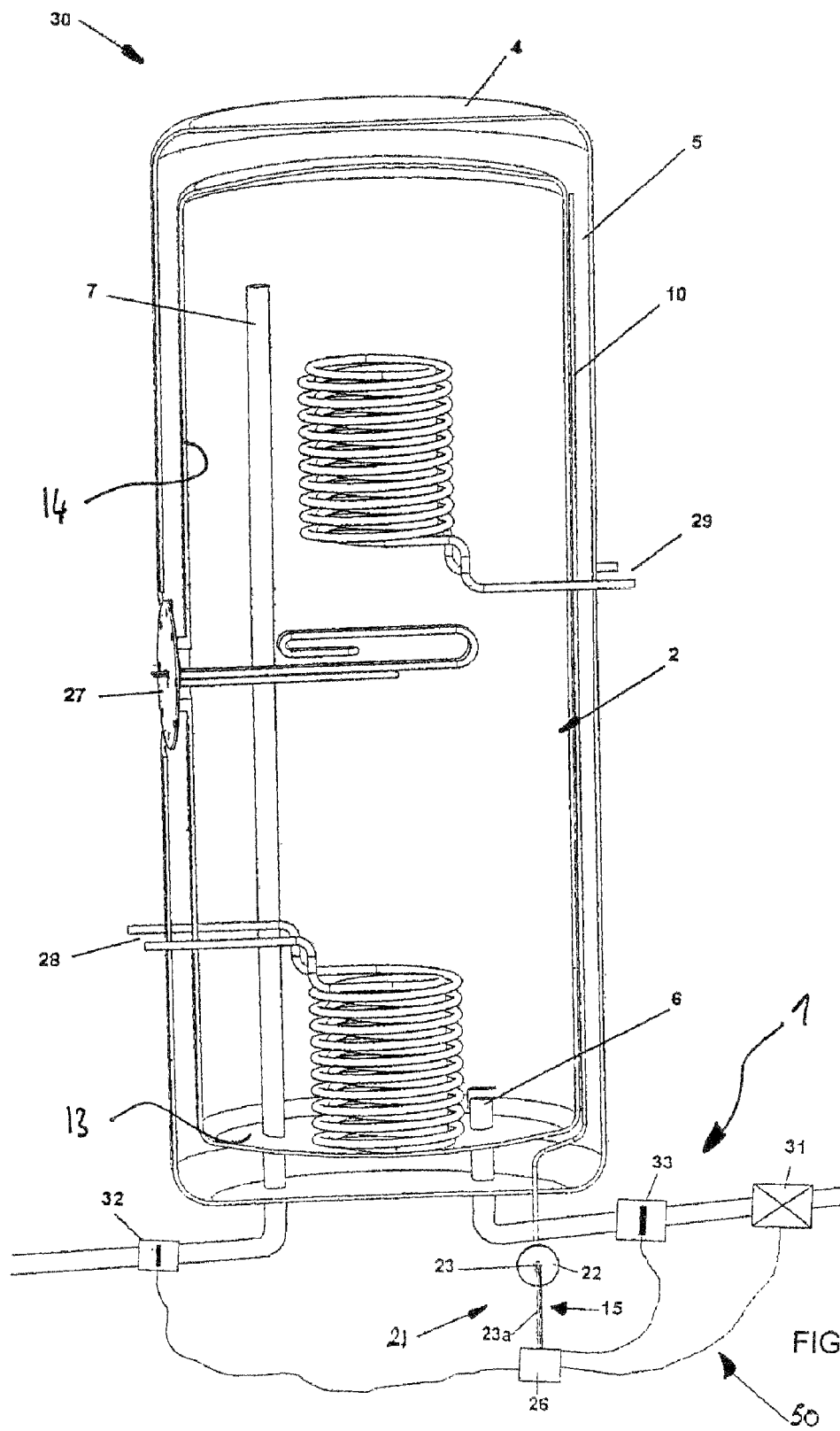
FIG. 1 is a view showing an electronic control device for conserving energy for heating the water contained in a storage tank and more particularly in a tank of an electro-solar or hydrosolar water heater according to the present invention.

FIG. 1 shows an electronic control device 1 for conserving energy for heating the water contained in a storage tank and more particularly in a tank 2 of an electro-solar or hydrosolar water heater 30.

The water heater 30 consists of an outer envelope 4 inside which the tank 2 is placed. The water heater 30 comprises a thermal insulation 5 between the outer envelope 4 and the tank 2.

The water heater 30 comprises a cold water inlet 6 and a hot water outlet 7 for the filling and removal of the water contained in the tank 2.

The water heater 30 comprises a coil 28 for circulating a fluid heated for example by solar collectors.

In this type of electro-solar or hydrosolar water heater 30, the resumption of heating is provided by an electrical resistor 27, or by circulating in a coil 29 a fluid heated by a boiler.

The water heater 30 comprises an electronic detection device 21 for measuring the quantity of hot water remaining in the tank 2.

The electronic control device 21 consists of a capillary tube 10 containing a heat transfer fluid and an amplification device 15 connected to an electronic control card 26.

The capillary tube 10 is provided with a length identical to the height of the tank 2, whether placed inside or outside said tank.

When the capillary tube 10 is placed outside the tank 2, the latter is pressed under the layer of thermal insulation 5 and pressed against and on the entire height of the vertical outer face 14 of said tank.

It should be noted that under the action of the heat contained in the water, the heat transfer fluid retained in the capillary tube 10 expands.

The amplification device 15 consists of a membrane 22 joined to an electronic sensor or gauge 23 connected via a connection 23a to the electronic control card 26. For this purpose, the amplification device 15 is placed outside the tank 2 of the electro-solar or hydrosolar water heater 30.

Thus the capillary tube 10 is connected hermetically to the membrane 22 which is deformed under the effect of the expansion of the heat transfer fluid. The electronic sensor or gauge 23 is pressed against the surface of the membrane 22.

The deformation of the membrane 22 is proportional to the expansion of the heat transfer fluid contained in the capillary tube 10. This deformation of the membrane 22 is transcribed into a variation of resistance usable by the electronic control card 26.

Thus, the quantity of hot water remaining in the tank 2 can therefore be determined by the electronic control card 26.

In this type of water heater, the time of resumption can be shifted, for example, to the end of the day.

Before initiating this resumption of heating, it is first necessary to check the quantity of hot water available in the tank 2 and to compare it with the user consumption profile to benefit to the maximum from the solar heat input for example.

Since the electronic detection device 21 according to the present invention provides accurate and continuous information on the quantity of hot water available in the tank 2, it is therefore possible to couple said device with control means 50 connected to the electronic card 26 and serving to determine the hot water consumption profile of the users in order to control the period or periods and the duration or durations of resumption of heating of the water contained in the tank 2.

Thus, the electronic control device 1 consisting of the electronic detection device 21, the control means 50 and the electronic control card 26, serves to determine accurately and in real time the optimal moment to resume heating.

The control means 50 consist of a flowmeter 31 placed, for example, at the cold water inlet 6 of the water heater 30 and a temperature probe 32 placed, for example, at the hot water outlet 7, said flowmeter 31 and said temperature probe 32 being connected to the electronic control card 26.

The control means 50 may comprise a temperature probe 33 placed, for example, at the cold water inlet 6 of the water heater 30 and connected to the electronic control card 26.

The addition of a temperature probe 32 placed at the cold water inlet 6 of the water heater 30 and connected to the electronic card 26 serves (knowing the temperature of the cold water entering the water heater at any time) to carry out the calculations of the quantity of useful hot water available (equivalent volume of water at 40° C. available) with greater accuracy than by using a mean cold water temperature of 12° C. for example.

In fact, the cold water temperature, although contained within a known temperature range, varies according to the regions and the seasons.

Figure 2:
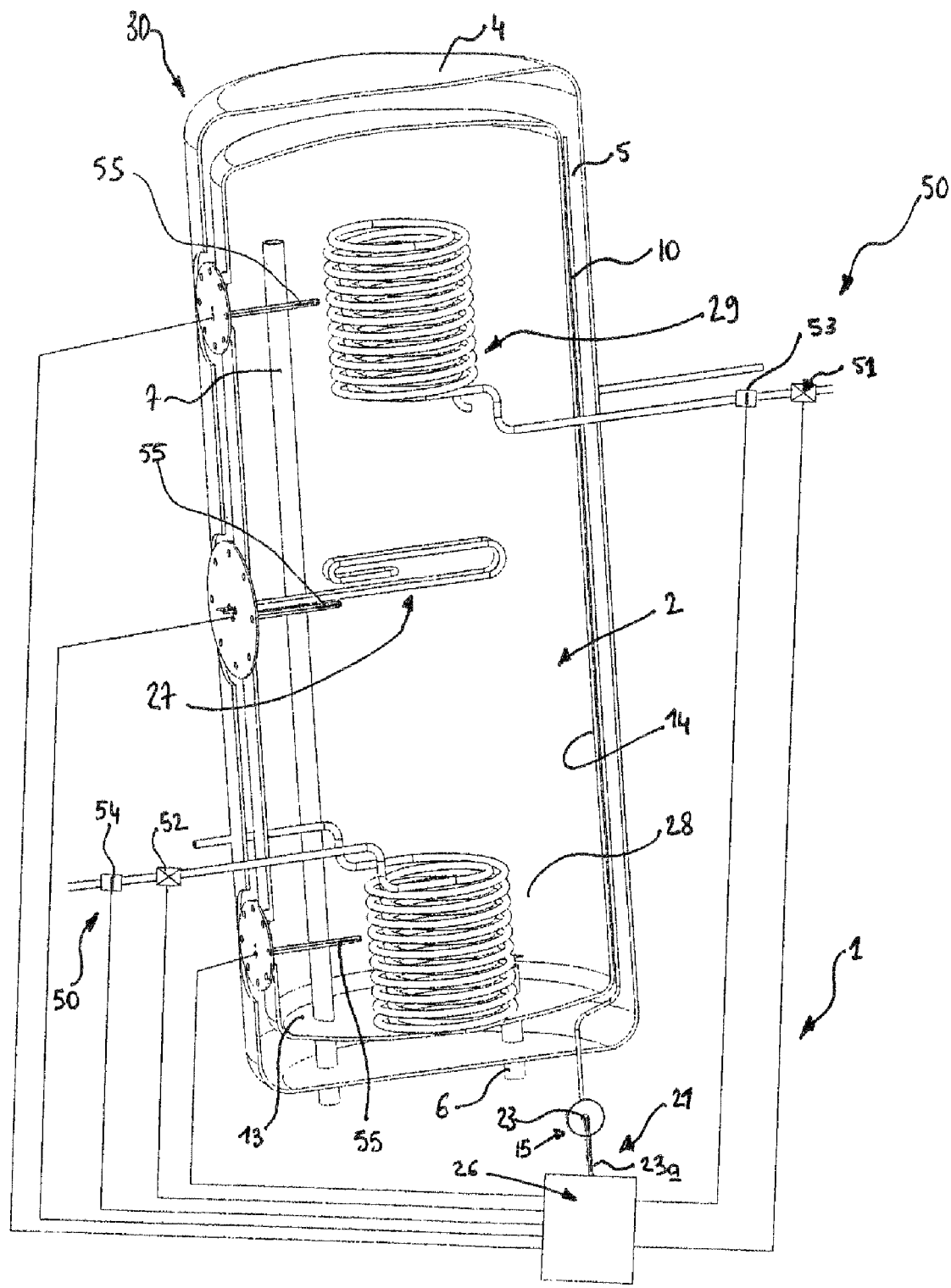
FIG. 2 is a view showing a preferred embodiment of the electronic control device for conserving energy for heating the water contained in a storage tank and more particularly in a tank of an electro-solar or hydrosolar water heater according to the present invention.

FIG. 2 shows a preferred embodiment of the invention concerning the control means 50 connected to the electronic card 26 and serving to determine the hot water consumption profile of the users in order to control the period or periods and the duration or durations of resumption of the heating of the water contained in the tank 2.

The control means 50 consist for example of a flowmeter 51, 52 and a temperature probe 53, 54 placed respectively at the inlet of the coil 28, 29 constituting the heat exchanger for transmitting, to the water contained in the water heater, the heat issuing from outside heating means other than an electrical resistor (boiler, heat pump, solar collector), said flowmeter 51, 52 and said temperature probe 51, 52 being connected to the electronic control card 26 via suitable connections.

The control means 50 comprise, for example, temperature probes 55 placed in the tank of the water heater, so as to be located close to the heating means 27, 28, 29 (coil or resistor), said temperature probes 55 being connected to the electronic control card 26 by suitable connections.

The amplification device 15 connected via the connection 23a to the electronic control card 26 serves to control, for example at least one resistor 27 for restarting an electric, electro-solar, hydrosolar, or hydroelectric water heater.

The amplification device 15 connected via the connection 23a to the electronic control card 26 serves to control the circulation of a heat transfer fluid issuing from a boiler or a heat pump in the coil 29 located inside the tank 2 of the water heater 30.

The control device 1, using information relative to the quantity of hot water present in the tank 2 of the water heater 30 provided by the electronic detection device 21 consisting of the capillary tube 10 and the amplification device 15, serves to compile a weekly record of the hot water consumption profiles during a learning phase.

The electronic control card 26, using information provided by the temperature probes 55 (the presence of these probes being optional), about the consumption profiles compiled during the learning phase, and information relative to the quantity of hot water contained in the tank 2 of the water heater 30, serves to initiate resumptions of heating at the timeliest moment, by means of the electrical resistor 27 or the coil 29 connected to a boiler or the coil 28 connected to a heat pump or other.

The electronic control device 1, using continuous information relative to the quantity of hot water contained in the tank 2 of the water heater 30, serves to vary, over time, the consumption profiles recorded during the learning phase.

The flowmeters 51, 52 and the temperature probes 53, 54 forming the control means 50 located at the inlet of the coils 28, 29 and connected to the electronic control card 26 serve, if necessary, to determine the heating capacities delivered by the boiler or the heat pump or the solar collector.

Depending on the water heater 30, the electronic control card 26 is suitable for controlling the circulation of a heat transfer fluid issuing from a boiler in a coil 29 located inside the tank 2 of a hydrosolar water heater 30 or for controlling the circulation of a heat transfer fluid issuing from solar collectors in a coil 28 located inside the tank 2 of an electro-solar or hydrosolar water heater 30.

Thus, the electronic control card 26, knowing the quantity of hot water remaining in the tank and the user consumption profile, serves to shift the period of resumption of the electric heating or of heating by an auxiliary boiler, in order to derive maximum advantage from the solar heat input if there is no immediate need for a large quantity of hot water.

The user consumption profile may be known by programming (by the users) or by acquisition of the consumption profile via the control means 50.

The consumption profile may be acquired via the control means 50 allowing a calculation, by compiling a record of the quantities of hot water consumed as a function of the time and the day.

The control means 50 may also consist of a programming card enabling the user to program his consumption profile.

With these various data (cold water and hot water temperatures, water consumption flow rate and duration, heating time by electric heater or by boiler), it is also possible to calculate the respective proportions of solar energy and auxiliary energy (electrical or boiler) consumed to obtain the quantity of sanitary hot water used, thereby serving to provide complete information to the user.

The electronic control card 26 can also perform other functions, such as the circulation of the fluid in the coil connected to the solar collector, the programming or learning of the user consumption profile, the metering of electrical and solar energy.

It must also be understood that the above description has only been provided by way of example and that it does not limit the scope of the invention, which is satisfied when replacing the described execution details by any other equivalents.

The invention claimed is:

1. A control device for conserving energy for heating water contained in a storage tank and more particularly in a tank (2) of a water heater (30) comprising a cold water inlet (6) and a hot water outlet (7), said control device comprising:
   an electronic detection device (21) for measuring the quantity of hot water remaining in the tank (2), the electronic detection device (21) providing a continuous reading of the quantity of hot water remaining in the tank (2),
   said electronic detection device (21) comprising a capillary tube (10) containing a heat transfer fluid and an amplification device (15) placed outside the tank (2) of the water heater (30) and connected to an electronic control card (26), said amplification device (15) being suitable for transmitting a variation in resistance to the electronic control card (26) under the effect of the expansion of the fluid contained in the capillary tube (10), and
   control means (50) connected to the electronic control card (26) for determining the hot water consumption profile of the users in order to control the period or periods of resumption of the heating of the water in the tank (2) of said water heater (30).

2. The control device as claimed in claim 1, the capillary tube (10) is placed either inside or outside the tank (2) of the water heater (30).

3. The control device as claimed in claim 2, wherein the capillary tube (10) is provided to be substantially the same height as the tank (2) of the water heater (30).

4. The control device as claimed in claim 1, wherein the amplification device (15) comprises a membrane (22) joined to an electronic sensor or gauge (23) connected via a connection (23a) to the electronic control card (26).

5. The control device as claimed in claim 4, wherein the capillary tube (10) is placed either inside or outside the tank (2) of the water heater (30), and the capillary tube (10) is connected hermetically to the membrane (22) of the amplification device (15) which is deformed under the effect of the expansion of the heat transfer fluid.

6. The control device as claimed in claim 1, wherein the amplification device (15) is connected via a connection (23a) to the electronic control card (26) for controlling at least one resistor (27) to restart the electro-solar or hydrosolar water heater (30).

7. The control device as claimed in claim 1, wherein the amplification device (15) is connected via a connection (23a) to the electronic control card (26) for controlling the circulation of a heat transfer fluid issuing from a boiler in a coil (29) located inside a hydrosolar water heater (30).

8. The control device as claimed in claim 1, wherein the amplification device (15) is connected via a connection (23a) to the electronic control card (26) for controlling the circulation of a heat transfer fluid issuing from solar collectors in a coil (28) located inside an electro-solar or hydrosolar water heater (30).

9. The control device as claimed in claim 1, wherein the control means (50) comprise a temperature probe (33) placed at the cold water inlet (6) of the water heater (30) and connected to the electronic control card (26).

10. The control device as claimed in claim 1, wherein the control means (50) comprise a flowmeter (31) placed at the cold water inlet (6) of the water heater and a temperature probe (32) placed at the hot water outlet (7), said flowmeter (31) and said temperature probe (32) being connected to the electronic control card (26).

11. The control device as claimed in claim 1, wherein the control means (50) comprise a flowmeter (51, 52) and a temperature probe (53, 54) placed respectively at the inlet of a coil (28, 29) located inside the tank (2) of the water heater (30), said flowmeters (51, 52) and temperature probes (53, 54) being connected to the electronic control card (26).

12. The control device as claimed in claim 1, wherein the control means (50) comprise temperature probes (55) placed in the tank of the water heater, so as to be located close to a resistor (27) and coils (28, 29), said temperature probes (55) being connected to the electronic control card (26) by suitable connections.

13. A control device for conserving energy for heating water contained in a tank (2) of a water heater (30) comprising a cold water inlet (6) and a hot water outlet (7), said control device comprising:
   an electronic detection device (21) configured for measuring the quantity of hot water remaining in the tank (2), the electronic detection device (21) providing a continuous reading of the quantity of hot water remaining in the tank (2),
   said electronic detection device (21) comprising
   i) a capillary tube (10) containing a heat transfer fluid,
   ii) an amplification device (15) placed outside the tank (2) of the water heater (30), and
   iii) an electronic control card (26) determining a quantity of hot water remaining in the tank (2),
   said amplification device (15) connected to said electronic control card, said amplification device (15) transmitting a variation in resistance to the electronic control card (26) under effect of expansion of the fluid contained in the capillary tube (10),
   the amplification device (15) comprising a membrane (22) connected hermetically to the capillary tube and joined to a measuring device (23) connected to the electronic control card (26), the membrane being deformed under effect of expansion of the fluid within the capillary tube, the deformation of the membrane being proportional to the expansion of the fluid with the capillary tube, the deformation being transcribed into a variation of resistance to the electronic control card, the membrane (22), measuring device (23), and the electronic control card all being located outside the tank; and
   control means (50) connected to the electronic control card (26), the control determining a hot water consumption profile of users in order to control the period or periods of resumption of the heating of the water in the tank (2) of said water heater (30), said profile compiled by said control means from a record of quantities of hot water consumed as a function of the time and the day.

14. The control device of claim 13, wherein the capillary tube is located outside the tank of the water heater.

15. The control device of claim 13, wherein,
the capillary tube is substantially a same height as an entire height of a vertical outer face (14) of the tank of the water heater, and
the capillary tube consists of consists of a straight vertical capillary tube over the entire height of the vertical outer face (14) of the tank of the water heater.

16. The control device of claim 15, wherein the capillary tube is located outside the tank of the water heater, the capillary tube pressed under a layer of thermal insulation (5) and pressed against and on the entire height of the vertical outer face (14) of the tank of the water heater.

17. The control device of claim 13, wherein the measuring device is one of an electronic sensor and gauge.

* * * * *